United States Patent [19]

Jennings, deceased

[11] 4,039,957
[45] Aug. 2, 1977

[54] SIGNAL ACTIVATED EMERGENCY ALARM DEVICE

[75] Inventor: Marvin E. Jennings, deceased, late of Topeka, Kans., by Dorothy Jennings, administratrix

[73] Assignee: Universal Industries, Inc., Topeka, Kans.

[21] Appl. No.: 664,814

[22] Filed: Mar. 8, 1976

Related U.S. Application Data

[63] Continuation of Ser. No. 389,693, Aug. 20, 1973, abandoned.

[51] Int. Cl.² ............................................. H04B 1/16
[52] U.S. Cl. .................................. 325/466; 325/364; 340/224
[58] Field of Search ............... 325/319, 364, 392, 403, 325/466; 307/252 R, 252 J, 252 N, 252 T, 252 W, 305, 311; 179/1 VC, 1 SW, 1 VL; 340/248 R, 224, 241, 421

[56] References Cited

U.S. PATENT DOCUMENTS

| | | | |
|---|---|---|---|
| 3,122,705 | 2/1964 | Craig et al. | 325/364 |
| 3,234,468 | 2/1966 | Craig | 325/466 |
| 3,258,603 | 6/1966 | Wright et al. | 307/252 J |
| 3,328,695 | 6/1967 | Ruthenberg | 325/403 |
| 3,706,911 | 12/1972 | Wilwerding | 307/311 |
| 3,810,137 | 5/1974 | Bacon, Jr. et al. | 325/364 |

Primary Examiner—Benedict V. Safourek
Assistant Examiner—Jin F. Ng
Attorney, Agent, or Firm—D. A. N. Chase

[57] ABSTRACT

Associated with a conventional household radio, an alarm circuit activated by the increased voltage of a sustained tone signal such as employed by the Emergency Broadcast System as public warning of an emergency condition.

7 Claims, 3 Drawing Figures

SIGNAL ACTIVATED EMERGENCY ALARM DEVICE

This is a continuation, of application Ser. No. 389,693, filed Aug. 20, 1973, now abandoned.

BACKGROUND AND SUMMARY OF THE INVENTION

In order to warn the public of pending dangerous weather conditions, civil defense type situations, and the like, the Emergency Broadcast System (EBS) interrupts normal AM and FM station broadcasts and transmits a carrier heavily modulated by a tone having a constant frequency of 1000 Hertz. Following this warning tone which lasts for a period of fifteen seconds, a description of the emergency condition and instructions as to safety measures are given. This same procedure is adaptable to all bands including special service, such as weather and police. If an individual is to receive the warning, he must, of course, be listening to a radio, otherwise, he will not receive the emergency warning in the event one is broadcast.

Various alarms are currently used to warn an individual, during the time he is not listening to a radio, that an emergency broadcast is being transmitted. To my knowledge, these alarms are activated either by relying on the EBS practice of interrupting the station carrier wave prior to the warning signal transmission, or by providing filter circuitry to select the EBS signal having a frequency of 1,000 Hertz. Once the alarm is activated, a buzzer, bell, light or other device is relied on as an instruction to the individual to listen for the forthcoming EBS broadcast. Due to their complex circuitry, these alarms are expensive and generally adaptable only to a single type of radio.

The primary object of the present invention is to provide an alarm circuit, associated with a household radio, activated by the increased voltage of a sustained tone signal appearing as modulation on a carrier that is more heavily modulated than during normal station broadcasting, and operable to allow this signal to be broadcast over the speaker of the radio.

Another object of this invention is to provide an alarm circuit which is adaptable to any type of radio whether it be tube, transistorized with an audio output transformer, or transistorized with a direct transistor output, and which is operative with a radio having any type of voltage source, whether it be AC, DC, or a combination thereof.

Another object of this invention is to provide an alarm circuit having an open circuit when inoperative and in which, therefore, power consumption is minimized.

A further object of this invention is to provide an alarm device having simplified circuitry which can be economically manufactured and easily installed in radios.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith.

DETAILED SPECIFICATION AND GENERAL OPERATION

Figure 1:
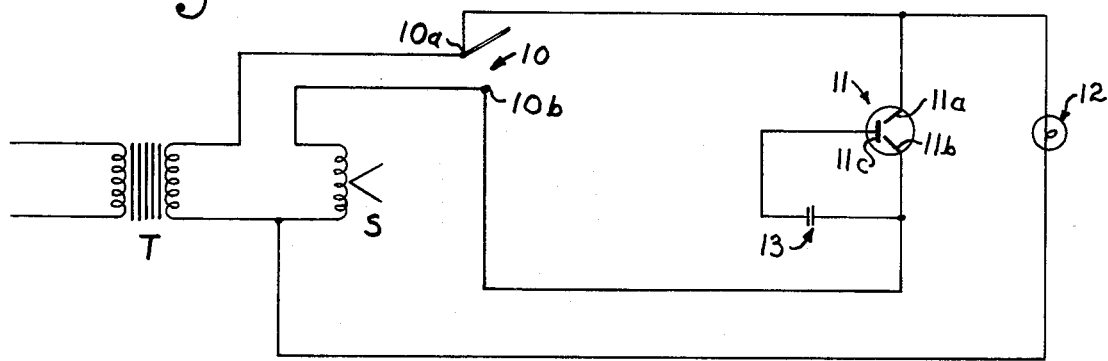
FIG. 1 is a schematic electrical diagram of a radio audio output circuit equipped with one embodiment of a signal activated alarm circuit of the present invention, wherein a light activated silicon controlled rectifier is utilized.
Figure 2:
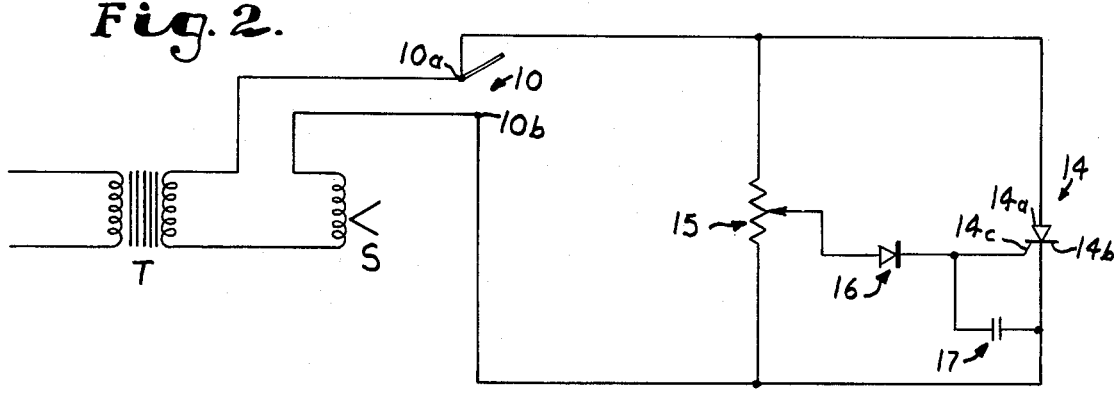
FIG. 2 is a schematic electrical diagram of a modified signal activated alarm circuit constituting a preferred embodiment and operatively connected with a conventional audio output system having an output transformer.
Figure 3:
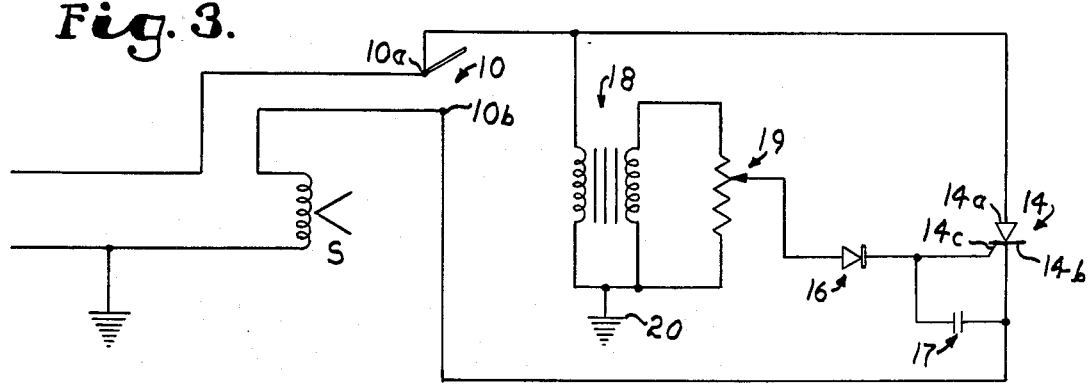
FIG. 3 is a schematic electrical diagram of another modification and shows a signal activated alarm circuit operatively connected with a conventional audio output system having no output transformer.

In each figure, an alarm circuit is shown connected in the audio output system of a conventional household radio. Output transformer T and speaker S in FIGS. 1 and 2 are the usual components in the audio output system. However, a number of transistor radios are commercially available which do not employ an audio output transformer. This type of radio is represented in FIG. 3. The remaining portion of the radio in each figure has not been shown.

Single pole single throw switch 10 provides in each instance the connection between the operating circuit of the alarm and the audio output system of the radio. When switch 10 is closed to connect terminal 10a and terminal 10b, the operating circuit is shunted and the audio output system functions as it normally would. When switch 10 is open as illustrated, the operating circuit of the alarm is connected in the audio system and will function in the manner subsequently to be described.

During the period of time an individual does not wish to listen to normal station broadcasts, but does desire to hear the EBS warning signal should one be given, he may utilize the alarm constructed in accordance with FIG. 1 in the following manner. First, with switch 10 closed, the radio is turned on and tuned to the local station on which the warning signal will be received. Secondly, switch 10 is opened and the volume control is increased until sound is heard over the speaker. Thirdly, the volume control is decreased until no sound is heard over the speaker.

After the alarm is properly set, signals from output transformer T travel to the operating circuit of the alarm which includes anode 11a and cathode 11b of normally "off" light activated silicon controlled rectifier 11 and to lamp 12. Rectifier 11 acts as an open switch, blocking current flow by virtue of its high resistance in the circuit. At a specific light value rectifier 11 becomes conductive, allowing current flow from anode 11a to a cathode 11b. As long as the light is of sufficient intensity, rectifier 11 will continue to conduct because of the unbalanced condition in the molecular structure of the silicon created by light energy.

Lamp 12 provides the light source for turning on rectifier 11. Light intensity fluctuates with the mean voltage of the signals in the audio output system. Peaks of heavy modulation are generally of short duration and are absorbed to a degree by the lag resulting from the heating of lamp 12. Sustained signals of a normal broadcast are usually of lower percent modulation of the carrier and do not provide sufficient light to activate rectifier 11.

To provide additional delay during high peaks of modulation, capacitor 13 is connected across gate 11c and cathode 11b and absorbs increased mean voltage of short duration. As the high modulation recedes, capacitor 13 discharges to assume the lower value of the light activated voltage at gate 11c. When a sustained, increased voltage resulting from a high modulation level is impressed, the capacitor 13 charges for approximately 2 to 3 seconds before gate 11c is closed.

At lower light levels the resulting voltage impressed on capacitor 13 is drained from gate 11c through the cathode 11b across the cathode-gate junction, but as the light level increases the cathode-gate resistance is sufficient to build up enough positive potential at gate 11c to cause the rectifier to go into conduction. As long as the light continues to produce that degree of potential the capacitor 13 will remain charged to the voltage required to cause conduction. When the light recedes, the voltage created across the cathode-gate junction and stored in capacitor 13 will tend to lower due to the leakage through the junction until it falls below the conduction threshold, thereby causing the rectifier to cut off.

The alarms in FIGS. 2 and 3 differ from the alarm in FIG. 1 in the method for deriving the trigger voltage for the gate. A regular silicon controlled rectifier 14 with a voltage divider network is used in place of the light activated rectifier and light bulb.

The alarms constructed in accordance with FIGS. 2 and 3 may be utilized in the following manner. First, with switch 10 closed the radio is turned on, the local station on which the warning signal will be received is selected, and the volume control is preferably set at the maximum level. Next, switch 10 is opened and a potentiometer (15 in FIG. 2 and 19 in FIG. 3) is adjusted just below the threshold of SCR 14 so that the normal broadcast is no longer heard over the speaker.

Referring to FIG. 2, with switch 10 in the open position signals from output transformer T travel to the operating circuit of the alarm which includes anode 14a and cathode 14b of normally off silicon controlled rectifier 14. All signals to speaker S will be blocked by SCR 14 until the latter is turned on. Potentiometer 15 (and potentiometer 19 in FIG. 3) forms an adjustable voltage divider for closing gate 14c and turning on SCR 14 when a strong, sustained signal is received by the operating circuit.

During normal station broadcasts, the modulation on the carrier will occasionally be heavy, approaching 100%. It is desirable that this signal should not turn on rectifier 14 because the sustained EBS tone (which is purposely impressed on the carrier at the 100% modulation level) has not been transmitted. Therefore, capacitor 17 is connected across gate 14c and cathode 14b of SCR 14. Capacitor 17 and the resistance of potentiometer 15 in conjunction with the cathode-gate junction resistance of SCR 14 form an RC time delay circuit which prevents the closing of gate 14c when only momentary peaks of high modulation percentage are received. A circuit so constructed blocks normal broadcast signals of all modulation levels, including signals having momentary peaks of high modulation, but allows a sustained, strong modulating signal to be heard over the speaker of the radio.

Referring now in more detail to FIG. 3, the alarm device is shown for use with an audio output system having no output transformer. This alarm functions essentially the same as the one shown in FIG. 2 and the circuitry differs only as to the voltage divider network. Since a direct potential (positive on anode 14a) is present in the audio output system having no output transformer, the gate of SCR 14 in FIG. 2 would always reflect a portion of that potential. To remove the DC component, transformer 18 is provided in FIG. 3 to allow only the AC component to be received by potentiometer 19.

Chassis ground 20 is required to bypass speaker S. If the primary coil of transformer 18 is not returned directly to ground, but is returned to speaker S, it would merely serve in series with speaker S and all signals would be audible.

Since the operating circuit in either FIG. 2 or FIG. 3 is normally open, and is closed only during the time the alarm is being given, power consumption is minimized. In addition, ease of installation in a radio is to be emphasized. This requires only cutting or disconnecting the speaker lead in the radio and connecting the alarm as illustrated in the drawings.

Special Operational Considerations

In addition to the general operation of the present invention set forth hereinabove, several special features of the operation should be understood. First of all, it may be noted that the silicon controlled rectifiers 11 and 14 in FIGS. 1 and 2 have an alternating potential applied to their anodes and cathodes (which are the switching connections of these devices). Accordingly, the SCR in either circuit can conduct only during alternate half cycles when the anode is positive. Nonetheless, the speaker S is operated by the intermittent conduction of the SCR although the tonal quality is not as would be obtained from a sinusoidal audio signal. For alarm purposes, however, the tone produced by the speaker S is quite adequate and recognizable.

In the embodiment of FIG. 2, the capacitor 17 has an additional function during negative half cycles of the audio warning signal in the output system of the receiver. During this half cycle when SCR 14 is not conducting, the charge built up in the capacitor 17 assists in maintaining the positive potential on gate 14c so that the SCR remains conductive when the anode 14a is again positive. (In FIG. 3, the SCR 14 is continuously conducting once gated since the amplitude swing of the audio component is much less than the direct voltage across the anode-cathode connections.)

Now in regard to the initial activation of the alarm circuit, the delay time desired before triggering SCR 14 in response to the reception of the EBS warning tone is approximately 3 to 5 seconds, this delay being caused by the charging action of capacitor 17. This accomplishes two important functions. First, the delay prevents the alarm from operating in response to high modulation peaks as discussed above. Only the sustained EBS signal which was present as 100% (or essentially 100%) modulation on the received carrier wave is capable of charging capacitor 17 to the trigger level of the gate 14c, since the amplitude of such signal is well above the mean voltage of the audio signals present in normal station broadcasting and the duration thereof is substantially longer. Secondly, this renders the circuit frequency sensitive to a degree in that the necessary potential for triggering the gate 14c is more rapidly built up by a higher frequency audio signal such as the 1000 Hz EBS tone, in contrast to lower frequency signals of greater than usual duration sometimes present in normal broadcasting. The value of capacitor 17 is preferably 100 mfd.

Having thus described the invention, what is claimed as new and desired to be secured by Letters Patent is:

1. In combination with a radio receiver having an audio output system including a speaker, wherein said receiver when tuned to an emergency broadcast will receive a carrier wave heavily modulated with a sustained audio signal, a signal activated alarm circuit comprising:
   a silicon controlled rectifier having anode and cathode connections between which current flow is normally interrupted, and also having a gate responsive to applied excitation for closing the cathode-anode circuit to establish electrical continuity between said connections;
   circuit means coupling said connections in series with said speaker, and including a two position switch connected in said audio output system and having a first position permitting normal operation of said speaker and a second position rendering said speaker responsive to operation of said rectifier; and
   control means connected with said audio output system for receiving signals present in said system when said switch is in its second position, said control means including signal responsive means operably associated with said gate for delivering excitation to the gate derived from said signals present in said system, and a capacitor coupled between said gate and said cathode,
   said control means delivering excitation to said gate sufficient to close said cathode-anode circuit and operate said speaker only in response to said sustained audio signal in said audio output system of at least a predetermined duration which was present as heavy modulation on the received carrier wave of said emergency broadcast.

2. The alarm circuit as claimed in claim 1, wherein said control means prevents delivery of said sufficient excitation if the mean amplitude of signals in said audio output system is that as produced by the reception of normal broadcasting.

3. The alarm circuit as claimed in claim 1, wherein said capacitor prevents the delivery of said sufficient excitation to the gate if a signal is present in said audio output system less than said predetermined duration.

4. The alarm circuit as claimed in claim 1, wherein said silicon controlled rectifier is light activated, said signal responsive means comprising a lamp.

5. The alarm circuit as claimed in claim 1, wherein said silicon controlled rectifier is electrically responsive, said signal responsive means comprising a unidirectional current carrying device connected with said gate.

6. The alarm circuit as claimed in claim 5, wherein said control means further includes a voltage divider for receiving said signals present in said system when said switch is in its second position, and a diode constituting said current carrying device and connecting said divider with said gate.

7. The alarm circuit as claimed in claim 6, wherein said control means further includes a transformer interposed between said two position switch and said voltage divider for isolating said divider from direct current flowing in said audio output system.

* * * * *